UNITED STATES PATENT OFFICE.

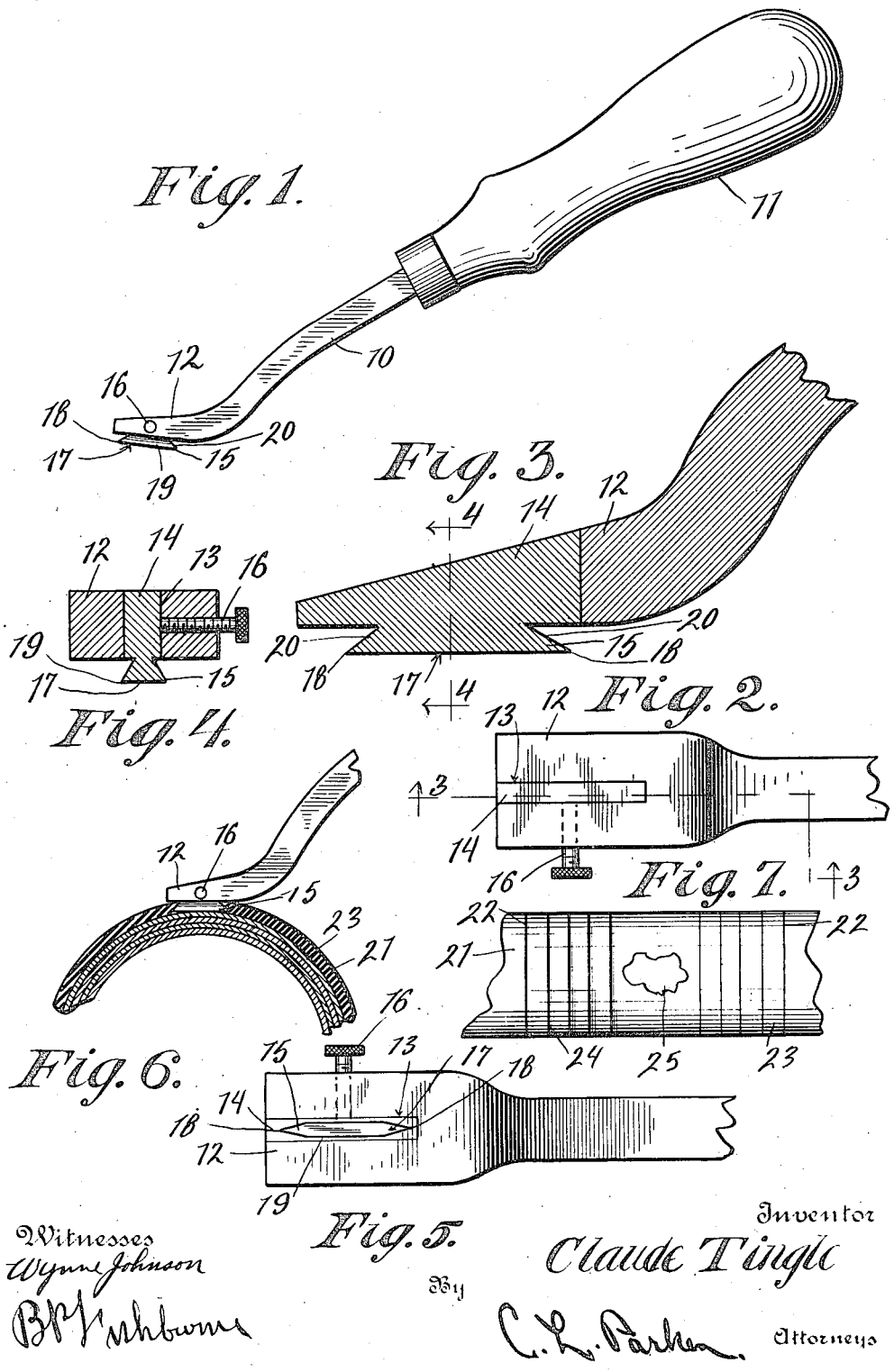

CLAUDE TINGLE, OF BELTON, TEXAS.

TIRE-CASING-REPAIR TOOL.

1,148,552.

Specification of Letters Patent.

Patented Aug. 3, 1915.

Application filed September 24, 1914. Serial No. 863,415.

*To all whom it may concern:*

Be it known that I, CLAUDE TINGLE, a citizen of the United States, residing at Belton, in the county of Bell and State of Texas, have invented certain new and useful Improvements in Tire-Casing-Repair Tools, of which the following is a specification.

My invention relates to improvements in tools or implements, for stepping or cutting away parts of a tire casing or shoe, in repairing blow-outs or punctures.

In repairing blow-outs or punctures, in tire casings or shoes, the layers constituting the tire casing are stepped or cut away in proximity to the blow-out opening, that is each inner layer is cut to project inwardly for a substantial distance past the next outer layer. In thus stepping the layers of the tire casing, each layer should be cut without cutting the next inner layer, for if the next inner layer be partly or wholly cut, the tire casing will be weakened. After the layers of the tire casing, adjacent the blow-out, are thus stepped, the repair layers are arranged in proper order upon the stepped layers, and cemented thereto, after which the repaired portion of the tire is placed in a vulcanizer and the patch thoroughly vulcanized, as is well known.

Heretofore, great difficulty has generally been encountered in the stepping of the tire casing, preparatory to repairing blow-outs. In thus stepping each layer of the tire casing by the tools now in use, such as the ordinary knife, if great care is not taken, the next inner layer is often cut. If sufficient care is exercised whereby this will not occur, the process is tedious and time consuming, and notwithstanding the exercise of a high degree of care, the wrong layer or layers are often accidentally cut.

As far as I am aware, no implement or tool has been devised whereby the layers of the tire casing may be expeditiously and conveniently stepped or cut, without liability of cutting the wrong layer.

It is therefore an object of the present invention to provide a tool or implement of simple construction, which is convenient in use, and by the employment of which the layers of the tire casing may be quickly stepped or cut without liability to cutting the wrong layers.

A further object of the invention is to provide a device of the above mentioned character, which is inexpensive to manufacture, strong, durable, and adjustable for accurately cutting layers of different thicknesses, without injury to the next inner layer.

Other objects and advantages of the invention will be apparent during the course of the following description.

In the accompanying drawings forming a part of this specification and in which like numerals are employed to designate like parts throughout the same, Figure 1 is a side elevation of a tool or implement embodying my invention, Fig. 2 is a fragmentary plan view of the same, Fig. 3 is a longitudinal sectional view taken on line 3—3 of Fig. 2, Fig. 4 is a transverse sectional view taken on line 4—4 of Fig. 3, Fig. 5 is a fragmentary bottom plan view of the same, Fig. 6 is a fragmentary side elevation of the tool, showing the same cutting the material of the tire casing, and, Fig. 7 is a diagrammatic view illustrating the stepping of the tire casing.

In the drawings, wherein for the purpose of illustration is shown a preferred embodiment of my invention, the numeral 10 designates the shank or lever of the tool or implement, the upper end of which extends into and is rigidly connected with a handle 11 of convenient shape and size. Formed upon the outer or lower end of the shank 10 is a preferably substantially flat guide extension or head 12, provided with a preferably longitudinally extending slot 13. Vertically adjustably mounted within the slot 13, as more clearly shown in Figs. 3 and 4, is a head or back 14, carrying a depending cutter-blade 15, preferably formed integral therewith. By means of a clamping screw or bolt 16, the head or back 14 may be locked in the desired vertical position with respect to the head 12. The function of thus adjusting the head or back 14 is to cause the cutter-blade 15 to properly operate in cutting layers of different thicknesses without cutting the next inner layers. The cutter-blade 15, as more clearly shown in Figs. 3 and 4, is preferably substantially trapezoidal in longitudinal and transverse cross-sections, the same increasing in length and width downwardly. As more clearly shown in Fig. 5, this cutter-blade 15 has a flat base 17, provided with pointed or tapered ends 18. The edge 19 of the base 17 is sharpened, and (see Fig. 3) the end edges 20 are sharpened. By the peculiar shape of the cutter-blade, or the provision of the under cut cutting edges thereof, the same tends to move upwardly, in operation, and not downwardly, whereby liability to cut the next inner layer is eliminated.

In repairing the blow-out, (see Figs. 6 and 7) the outer layer 21 of the tire casing is cut transversely along lines 22, the cutter-blade 15 being adjusted to properly completely cut the outer layer without liability to cutting the next inner layer 23, the guide extension 12, slidably engaging the upper surface of the layer being cut. It is obvious that the flat or blunt base 17 of the cutter-blade will slide along the next inner layer 23, without cutting the same. The outer layer 21 being cut along the lines 22, the cut out portion thereof is removed, and the next inner layer 23 is cut along the lines 24, subsequent to which its cut out portion is removed. In a similar manner, each inner succeeding layer is cut, until the innermost layer having the blow out opening 25 therein, is reached. The repair layers are now placed in stepped relation upon the protruding ends of the layers, cemented thereto, and vulcanized.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, what I claim is:—

1. A tool or implement for stepping a tire casing in repairing blow-outs, comprising a shank provided with a guide member, and a cutter-blade connected with the guide member and extending below the same with the guide member extending upon opposite sides of the cutter-blade for substantial distances.

2. A tool or implement for stepping a tire casing in repairing blow-outs, comprising a shank provided with a guide extension and a depending cutter-blade connected with the guide extension, and having a blunt lower base and a sharpened cutting end.

3. A tool or implement for stepping a tire casing in repairing blow-outs, comprising a shank having a guide head, a depending cutter-blade connected with the head, and having a blunt base and sharpened cutting ends.

4. A tool or implement for stepping a tire casing in repairing blow-outs, comprising a shank, a guide head carried thereby, and a cutter-blade connected with the guide head and extending therebelow, formed substantially trapezoidal in longitudinal vertical cross-section, providing a blunt base and sharp cutting ends.

5. A tool or implement for stepping a tire casing in repairing blow-outs, comprising a guide member adapted to slidably engage with the exterior surface of the layer to be cut, and a cutter-blade adjustably connected with the guide member and extending beyond the engaging face thereof for a substantial distance.

In testimony whereof I affix my signature in presence of two witnesses.

CLAUDE TINGLE.

Witnesses:
J. L. Beringer,
C. O. Welsen.